(12) United States Patent
Takagi et al.

(10) Patent No.: US 11,027,516 B2
(45) Date of Patent: Jun. 8, 2021

(54) BODY WIPING SHEET

(71) Applicant: Oji Holdings Corporation, Tokyo (JP)

(72) Inventors: Mizue Takagi, Tokyo (JP); Asami Kawaguchi, Tokyo (JP); Ayako Takahashi, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 113 days.

(21) Appl. No.: 16/099,543

(22) PCT Filed: Jun. 28, 2017

(86) PCT No.: PCT/JP2017/023820
§ 371 (c)(1),
(2) Date: Nov. 7, 2018

(87) PCT Pub. No.: WO2018/003885
PCT Pub. Date: Jan. 4, 2018

(65) Prior Publication Data
US 2019/0200815 A1    Jul. 4, 2019

(30) Foreign Application Priority Data

Jun. 29, 2016 (JP) ................................. 2016-128481
Jan. 20, 2017 (JP) ............................. JP2017-008531

(51) Int. Cl.
| | | |
|---|---|---|
| B32B 3/10 | (2006.01) | |
| B32B 5/02 | (2006.01) | |
| B32B 27/12 | (2006.01) | |
| B32B 27/30 | (2006.01) | |

(52) U.S. Cl.
CPC .............. *B32B 5/022* (2013.01); *B32B 27/12* (2013.01); *B32B 27/308* (2013.01); *B32B 2262/0253* (2013.01); *B32B 2262/0284* (2013.01); *B32B 2307/726* (2013.01); *B32B 2555/00* (2013.01); *Y10T 428/24777* (2015.01)

(58) Field of Classification Search
None
See application file for complete search history.

(56) References Cited

FOREIGN PATENT DOCUMENTS

| | | | | |
|---|---|---|---|---|
| JP | H09-215648 A | | 8/1997 | |
| JP | H09215648 A | * | 8/1997 | ............. B32B 38/08 |
| JP | H09-252994 A | | 9/1997 | |
| JP | 2000-107067 A | | 4/2000 | |
| JP | 2000107067 A | * | 4/2000 | |
| JP | 2003-250714 A | | 9/2003 | |
| JP | 2004-073529 A | | 3/2004 | |
| JP | 2004-313557 A | | 11/2004 | |
| WO | WO-2004008929 A1 | * | 1/2004 | ............. B32B 38/08 |

OTHER PUBLICATIONS

Machine translation of Wo2004008929 Year 2004.*
Machine translation of JPH09215648 Year 1997.*
Machine translation of JP2000107067 Year 2000.*
International Search Report for International Application No. PCT/JP2017/023820 dated Sep. 19, 2017 (1 Sheet).

* cited by examiner

*Primary Examiner* — Christopher M Polley
(74) *Attorney, Agent, or Firm* — Kratz, Quintos & Hanson, LLP

(57) ABSTRACT

A body wiping sheet (1) comprising two surface layers (2, 3) each comprising a non-woven fabric, and a water-absorbent polymer layer that contains a water-absorbent polymer and that is disposed between the two surface layers (2, 3) in a stacked manner.

19 Claims, 11 Drawing Sheets

BODY WIPING SHEET

TECHNICAL FIELD

The present invention relates to a body wiping sheet.

BACKGROUND ART

Body wiping sheets with water-holding properties have been known. For example, PTL 1 and PTL 2 disclose a wet-type body wiping sheet comprising a water-absorbent polymer and an aqueous cleaning agent. Further, PTL 3 discloses a steamed towel comprising a water-absorbent resin between cloth towels.

CITATION LIST

Patent Literature

PTL 1: JP2004-313557A
PTL 2: JP2003-250714A
PTL 3: JPH9-252994A

SUMMARY OF INVENTION

Technical Problem

However, the wiping sheets disclosed in PTL 1 and PTL 2 are wet sheets and cannot be stored in a dry state before use. Further, when used with people who have allergies or skin diseases, it is sometimes not desirable to bring the wiping sheet disclosed in PTL 1 or PTL 2 into contact with their bodies.

Since repeated use of the steamed towel disclosed in PTL 3 can result in propagation of unwanted bacteria, the cloth towels must be separated from the water absorption resin and washed to use them hygienically, which is cumbersome for the user.

An object of the present invention is to provide a non-woven fabric-type body wiping sheet that is disposable, capable of being stored in a dry state before use, has excellent water-holding properties at the time of use, and has excellent heat retention properties when warmed at the time of use.

Solution to Problem

To achieve the object, the present inventors found that the above object can be achieved by using a body wiping sheet comprising two surface layers each comprising a non-woven fabric, and a water-absorbent polymer layer that contains a water-absorbent polymer and that is disposed between the two surface layers. The present invention has thus been completed.

According to one aspect of the present invention, a body wiping sheet is provided, comprising two surface layers each comprising a non-woven fabric, and a water-absorbent polymer layer that contains a water-absorbent polymer and that is disposed between the two surface layers in a stacked manner.

In one embodiment, the body wiping sheet is a dry sheet and is moistened with water in use.

In another embodiment, the water-absorbent polymer layer is a sheet containing a water-absorbent polymer incorporated into a fibrous material, a sheet containing a water-absorbent polymer dispersed and solidified on a fibrous material, or a sheet containing a water-absorbent polymer processed into a fibrous structure.

In another embodiment, the water-absorbent polymer layer contains the water-absorbent polymer in an amount capable of maintaining the temperature of the body wiping sheet at 30° C. or higher after the body wiping sheet is immersed in water for a duration of time to sufficiently swell the polymer, heated to 60° C., and then stored for 10 minutes in an environment at 20 to 25° C. at a humidity of 40 to 80%.

In another embodiment, the body wiping sheet does not contain an aqueous cleaning agent.

In another embodiment, the surface layers and the water-absorbent polymer layer are fixed at least at one point.

In another embodiment, the at least one fixing portion is substantially linear.

In another embodiment, the at least one substantially linear fixing portion extends from one end to the other end of the body wiping sheet.

In another embodiment, the body wiping sheet is substantially rectangular, and the at least one fixing portion comprises two substantially linear fixing portions at least in one direction.

In another embodiment, the at least one fixing portion comprises two substantially linear fixing portions that are provided at both ends of the body wiping sheet and that are formed simultaneously when the two surface layers are joined to each other.

In another embodiment, the at least one fixing portion is a joined portion obtained by heat sealing.

In another embodiment, the water-absorbent polymer layer is separated into two portions by a depressed portion that extends substantially linearly in the longitudinal direction at the center of the width direction of the body wiping sheet.

In another embodiment, the body wiping sheet is substantially rectangular and further has two guiding lines extending along imaginary lines that extend apart from each other in the longitudinal direction of the body wiping sheet between a long side of the body wiping sheet and positions each located at the same distance from the center of the longitudinal direction of the body wiping sheet in the line extending in the longitudinal direction of the body wiping sheet at the center of the width direction of the body wiping sheet.

In another embodiment, the body wiping sheet further comprises a small piece that is attached to a corner of one of the two surface layers and that defines a pocket for accommodating the body wiping sheet between the piece and one of the surface layers.

Advantageous Effects of Invention

The body wiping sheet according to the present invention is capable of being stored in a dry state before use, shows excellent water holding properties at the time of use, and shows excellent heat retention properties when warmed. Further, the body wiping sheet is disposable after use and is thus hygienic.

DESCRIPTION OF EMBODIMENTS

The following describes the body wiping sheets according to the first to thirteenth embodiments of the present invention with reference to FIGS. 1 to 11.

Figure 1:
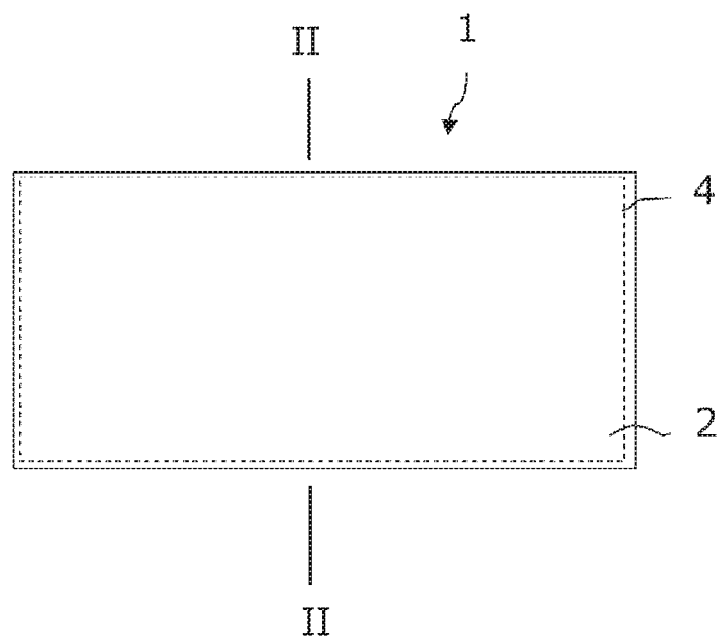
FIG. 1 is a plan view of the body wiping sheet according to the first embodiment of the present invention.
Figure 2:
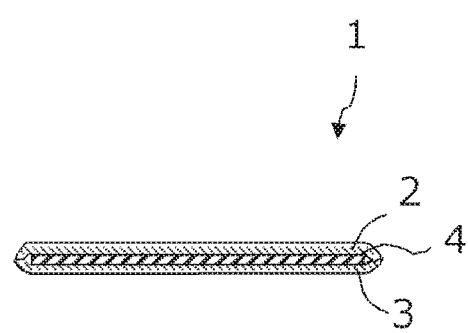
FIG. 2 is a sectional view along the II-II line in FIG. 1.

As shown in FIGS. 1 and 2, the body wiping sheet 1 according to the first embodiment of the present invention is a substantially rectangular stacked sheet in which two surface layers 2 and 3 each comprising a non-woven fabric, and one or more water-absorbent polymer layers 4 that contain a water-absorbent polymer and that are disposed between the two surface layers 2 and 3, are stacked. Both surfaces of the surface layer 2 and the surface layer 3 can be used to wipe and clean the body.

Further, as shown in FIG. 2, the ends of the water-absorbent polymer layer 4 are sealed by two surface layers, i.e., surface layers 2 and 3. Specifically, the width of the water-absorbent polymer layer 4 is less than the width of the two surface layers 2 and 3, and the length of the water-absorbent polymer layer 4 is less than the length of the two surface layers 2 and 3. The water-absorbent polymer layer 4 is enclosed by the two surface layers 2 and 3, and the peripheral ends of the water-absorbent polymer layer 4 are sealed by the two surface layers 2 and 3. The sealing of the water-absorbent polymer layer 4 with the two surface layers 2 and 3 may be performed by welding with ultrasonic welding or heat sealing, adhesion with an adhesive, sewing with thread, bonding by embossing, fusing with a fusing machine, welding with a welding machine, or the like. Sealing of the water-absorbent polymer layer 4 with the two surface layers 2 and 3 prevents removal of the water-absorbent polymer layer 4 from the body wiping sheet 1. Since the water-absorbent polymer layer 4 is confined in the space defined by the two surface layers 2 and 3, the water-absorbent polymer is prevented from leaking outside the body wiping sheet 1.

Figure 3:
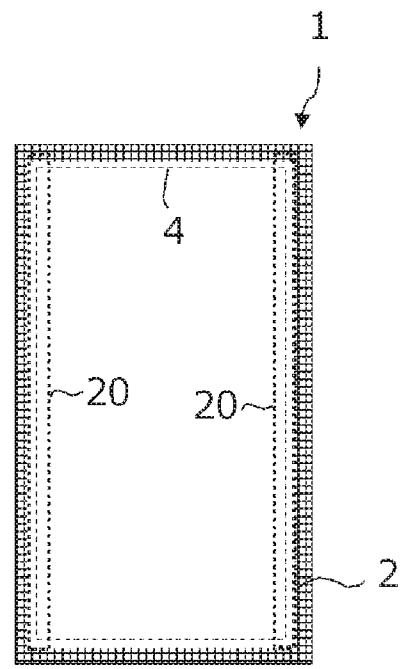
FIG. 3 is a schematic plan view of the body wiping sheet of FIG. 1, showing the joining of each material of the body wiping sheet.

The water-absorbent polymer layer 4 is preferably fixed to the surface layer 2 or the surface layer 3, or both, at least at one point. Fixing of the water-absorbent polymer layer 4 to the surface layers 2 and 3 eliminates or reduces the relative displacement between the layers. According to this embodiment, as shown in FIG. 3, three layers, including both surface layers 2 and 3 and the water-absorbent polymer layer 4, are fixed at the regions or areas of the fixing portions 20, which are enclosed by rectangular imaginary lines at both ends along the longitudinal direction (or the long sides) of the water-absorbent polymer layer 4. Two fixing portions 20 are provided substantially linearly in parallel to each other along the longitudinal direction of the body wiping sheet 1, the surface layers 2 and 3, and the water-absorbent polymer layer 4. Each fixing portion 20 extends from one end to the other end of the body wiping sheet 1. The expression "extend from one end to the other end" as used herein indicates that the fixing portion 20 is provided such that an end of the fixing portion 20 is located 0 to 30 mm away from the nearest side of the body wiping sheet 1. Although the fixing portion 20 may extend through the full length of the body wiping sheet 1, the fixing portion 20 does not necessarily extend through the full length of the body wiping sheet 1. The expression "extend from one end to the other end" is used in both cases in which it extends from one end to the other end in the longitudinal direction of the body wiping sheet 1, and cases in which it extends from one end to the other end in the short direction that is vertical to the longitudinal direction of the body wiping sheet 1 (i.e., the width direction). The method of fixing the water-absorbent polymer layer 4 to the surface layers 2 and 3 is not particularly limited. For example, fixing may be performed by welding with ultrasonic welding or heat sealing, adhesion with an adhesive, sewing with thread, bonding by embossing, welding with a welding machine, or the like. For example, in terms of the fixing portions 20 according to the first embodiment, when the four sides of the two surface layers 2 and 3 are joined to each other at the shaded portions, the water-absorbent polymer layer 4 disposed between the surface layer 2 and the surface layer 3 can also be simultaneously joined at the fixing portions 20, making joining all at once possible.

The body wiping sheet 1 according to this embodiment is a dry sheet that is moistened with water in use. Therefore, the sheet can be hygienically stored for a long period of time. Moreover, the body wiping sheet 1 according to this embodiment is a lightweight dry sheet and is suitable for transportation and shipping of a large number of the sheets.

For use of the body wiping sheet 1 to wipe bodies, the body wiping sheet 1 is moistened with water.

Since the water-absorbent polymer in the water-absorbent polymer layer 4 retains water, the body wiping sheet 1 can be used to cool or warm a body part at which the body wiping sheet 1 is applied. The body wiping sheet 1 for cooling can be prepared, for example, by immersing the dry body wiping sheet 1 in ice water, cool water, tap water, or the like, or by moistening the body wiping sheet 1 with water and keeping it in a refrigerator. The body wiping sheet 1 for warming can be prepared, for example, by immersing the dry body wiping sheet 1 in warm water, or moistening the body wiping sheet 1 in cold or hot water and heating it in a microwave or placing it in a warming cabinet or a towel steamer.

Furthermore, when the body wiping sheet 1 is moistened with water, the water-absorbent polymer in the water-absorbent polymer layer 4 swells, increasing the thickness of the body wiping sheet 1 while improving the cushioning properties, compared to sheets consisting only of a non-woven fabric.

Further, when the surface layers 2 and 3 and the water-absorbent polymer layer 4 of the body wiping sheet 1 according to this embodiment are allowed to retain a suitable amount of water, the amount of water remaining on the skin can be reduced at the time when the wiping is performed, which can eliminate or reduce local coldness or cold sensation experienced by the person being wiped.

The body wiping sheet 1 according to this embodiment is a disposable product. Propagation of unwanted bacteria easily occurs, in particular, when body wiping products are used after warming. However, the body wiping sheet 1 of the present invention, which is disposable, can be used hygienically.

Further, the body wiping sheet 1 according to this embodiment does not contain an aqueous cleaning agent. An aqueous cleaning agent contains a cleaning component using water as a medium. Examples include surfactants. Therefore, the effect of the aqueous cleaning agent is eliminated when it is brought into direct contact with the body. An aqueous cleaning agent is also disclosed in JP2003-250714A and JP2004-313557A.

Next, each layer constituting the body wiping sheet 1 is described in detail.

The surface layers 2 and 3 each comprise a non-woven fabric. The fibrous material constituting the non-woven fabric may be natural or chemical fibers, or a combination of these fibers. Examples of natural fibers include cotton, pulp, wool, and the like. Examples of chemical fibers include regenerated cellulose fibers, such as rayon and copra; hydrophilic synthetic fibers, such as polyvinyl alcohol fiber and polyacrylonitrile fiber; synthetic fibers, such as polyethylene fiber, polypropylene fiber, polyester fiber, polyethylene terephthalate fiber, polyethylene terephthalate/polyethylene core-sheath bicomponent fiber, and polypropylene/polyethylene core-sheath bicomponent fiber, and those obtained by subjecting these fibers to hydrophilic treatment; and the like. The fibrous materials may be used alone or in a combination of two or more. For example, the surface layers 2 and 3 may be formed using a composite material comprising a hydrophilic fiber and heat-fusible fiber; the composite material preferably contains at least one member selected from cotton, pulp, and regenerated cellulose fibers, such as rayon and cupra, and at least one synthetic fiber selected from polyvinyl alcohol fiber, polyacrylonitrile fiber, polyethylene fiber, polypropylene fiber, polyester fiber, polyethylene terephthalate fiber, polyethylene terephthalate/polyethylene core-sheath bicomponent fiber, and polypropylene/polyethylene core-sheath bicomponent fiber. Even when the synthetic fiber used in the surface layers 2 and 3 is non-hydrophilic, the non-hydrophilic structure can be modified to hydrophilic, or such fiber can be subjected to hydrophilic treatment.

The fiber sheets constituting the surface layers 2 and 3 can be produced, for example, by a non-woven fabric manufacturing method such as a wet papermaking method, a spunlace method and an air-laid method. The basis weight of the fiber sheets constituting the surface layers 2 and 3 is, for example, 20 to 100 $g/m^2$, and preferably 30 to 70 $g/m^2$, from the viewpoint of the texture to, for example, prevent the leakage of the component of the water-absorbent polymer layer, although it depends on the overall structure of the body wiping sheet 1.

Neither the surface layer 2 nor the surface layer 3 necessarily consists of a single sheet. For example, each body wiping sheet 1 may comprise multiple surface layers 2, multiple surface layers 3, or a combination of these layers in a stacked manner. When multiple surface layers 2 are used, two or more surface layers 2, each formed of different fibers, may be stacked, or two or more surface layers 2, each formed of the same kind of fiber, may be stacked. Multiple surface layers 2 may be stacked to form a single non-woven fabric sheet. The portion in which the multiple surface layers 2 are stacked may be only part and not necessarily all of the sheet. When using multiple surface layers 3, the same conditions as for using multiple surface layers 2 also apply.

The water-absorbent polymer layer 4 contains a water-absorbent polymer. In addition to the water-absorbent polymer, the water-absorbent polymer layer 4 may further contain additives, such as fibrous materials and binders. The water-absorbent polymer layer 4 can be a sheet containing a water-absorbent polymer incorporated into a fibrous material, a sheet containing a water-absorbent polymer dispersed and solidified on a fibrous material, or a sheet containing a water-absorbent polymer processed into a fibrous structure.

The water-absorbent polymer used in the water-absorbent polymer layer 4 may be any water-absorbent polymer that is capable of absorbing and retaining a liquid. Specific examples include starch, crosslinked carboxylmethylated cellulose, polymers or copolymers of acrylic acid or acrylic acid alkali metal salt, polyacrylic acid and a salt thereof, and polyacrylate graft polymers. The water-absorbent polymers for use in the water-absorbent polymer layer 4 may be used alone or in a combination of two or more.

The fibrous material for use in the water-absorbent polymer layer 4 may be natural or chemical fibers, or a combination of these fibers. Examples of natural fibers include cotton, pulp, and wool. Examples of chemical fibers include regenerated cellulose fibers, such as rayon and cupra; hydrophilic synthetic fibers, such as polyvinyl alcohol fiber and polyacrylonitrile fiber; synthetic fibers, such as polyethylene fiber, polypropylene fiber, polyester fiber, polyethylene terephthalate fiber, and polyethylene terephthalate/polyethylene core-sheath bicomponent fiber, and those obtained by subjecting these fibers to hydrophilic treatment; and the like. The fibrous materials may be used alone or in a combination of two or more.

The fiber sheet constituting the water-absorbent polymer layer 4 may be produced, for example, by a non-woven fabric manufacturing method such as a wet papermaking method, a spunlace method and an air-laid method. The basis weight of the fiber sheet constituting the water-absorbent polymer layer 4 is, for example, 20 to 400 $g/m^2$, and preferably 30 to 350 $g/m^2$, although it depends on the basis weight of the entire body wiping sheet 1. Further, the fiber sheet constituting the water-absorbent polymer layer 4 may be a sheet obtained by simply stacking fibers, such as pulp or cotton.

The number of the water-absorbent polymer layers 4 is not limited to one. For example, each body wiping sheet 1 may comprise multiple water-absorbent polymer layers 4 in a stacked manner. When multiple water-absorbent polymer layers 4 are used, two or more water-absorbent polymer layers 4, each formed of different fibers, may be stacked, or two or more water-absorbent polymer layers 4, each formed of the same kind of fiber, may be stacked. The portion in which the water-absorbent polymer layers 4 are stacked may be only part and not necessarily all of the sheet.

The water-absorbent polymer layer 4 contains a water-absorbent polymer preferably in an amount capable of maintaining the temperature of the body wiping sheet 1 at 30° C. or higher after the body wiping sheet 1 is immersed in water for a duration of time to sufficiently swell the water-absorbent polymer, heated to 60° C., and then allowed to stand for 10 minutes in an environment at 20 to 25° C. at a humidity of 40 to 80%. Additionally or alternatively, the water-absorbent polymer layer 4 contains a water-absorbent polymer in an amount capable of maintaining the temperature of the body wiping sheet 1 at 25° C. or higher after the body wiping sheet 1 is immersed in water for a duration of time to sufficiently swell the water-absorbent polymer, heated to 60° C., and stored for 20 minutes in an environment at 20 to 25° C. at a humidity of 40 to 80%. In this case, the body wiping sheet 1 can be kept warm for a relatively long time after heating.

The body wiping sheet 1 may further contain one or more components selected from flavors, humectants, antibacterial agents, anti-inflammatory agents, insect repellents, and refreshing powders. These components may be incorporated in arty of the following: the surface layer 2, the surface layer 3, the water absorbent polymer layer 4, and other layers.

The flavor is not limited and may be natural or synthetic flavors. Examples include fragrant wood, essential oils, resins, musk, civet, castoreum, ambergris, menthol, lemon, grapefruit, lime, orange, bergamot, rose, jasmine, lily of the valley, lilac, vanillin, heliotropine, coumarin, benzoin, frankincense, myrrh, and the like.

Examples of antibacterial agents include, but are not particularly limited to, methylparaben and the like.

The humectant may be, but is not particularly limited to, any form, such as an ointment, a cream, and a lotion. Examples of ointments include white Vaseline, zinc oxide ointment, ceramide, Azunol ointment, and Saline ointment. Examples of creams include Urepearl, Keratinamin, Pastaron (soft), Widecall, and Hirudoid cream. Examples of lotions include Hirudoid lotion.

Examples of anti-inflammatory agents include, but are not particularly limited to, steroidal anti-inflammatory agents, such as prednisolone, betamethasone sodium phosphate, and dexamethasone sodium phosphate; and non-steroidal anti-inflammatory agents, such as aspirin, mefenamic acid, ibuprofen, naproxen, tiaprofenic acid, indomethacin, diclofenac sodium, loxoprofen sodium, sulindac, and piroxicam.

Examples of insect repellents include, but are not particularly limited to, N,N-diethyl-3-methylbenzamide (DEET), p-menthane-3,8-diol, eucalyptus oil, and other aroma oils.

A refreshing powder is a powder containing a cooling substance that causes an endothermic reaction by reacting with water. Examples of the cooling substance include, but are not particularly limited to, sugars, amino acids, urea, inorganic salts, and the like. Examples of the powder include talc, kaolin, mica, metal carbonate, metal silicate, clay, titanium mica, bismuth oxychloride, silica beads, plastic beads, plastic powder, cornstarch, and like edible powders.

The present invention is described above in accordance with the first embodiment as an example. However, the present invention is not limited to the above embodiment, and various modifications as described below are possible. In the following embodiments, the second to the thirteenth, the same reference numerals refer to the same materials used in the first embodiment, and their descriptions are omitted. The present invention encompasses the second to thirteenth embodiments not only independently but also in combinations.

Figure 4:
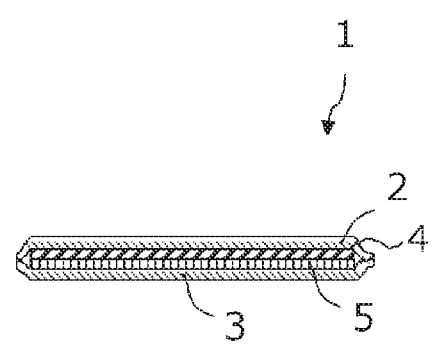
FIG. 4 is a plan view of the body wiping sheet according to the second embodiment of the present invention.
Figure 5:
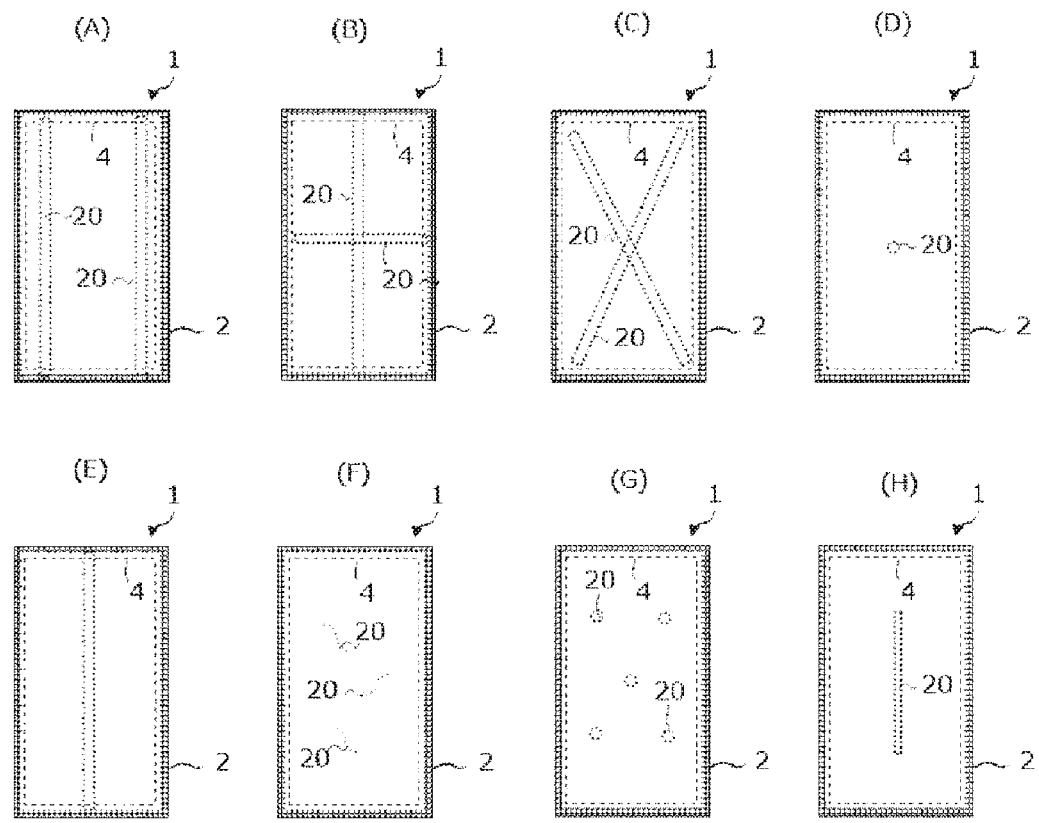
FIG. 5(A) to (H) are plan views of the body wiping sheets according to the third to tenth embodiments of the present invention.

As shown in FIG. 4, the body wiping sheet 1 according to the second embodiment may further comprise one or more additional layers 5, in addition to the surface layer 2, the surface layer 3, and the water-absorbent polymer layer 4. For example, the additional layer 5 may be a heat-fusible layer stacked between the surface layer 3 and the water-absorbent polymer layer 4 to help the adhesion between the surface layer 3 and the water-absorbent polymer layer 4. The heat-fusible layer may comprise, for example, heat-fusible fiber. Examples of heat-fusible fiber include polyolefin resins, such as polyethylene and polypropylene, polyester resins, such as polyethylene terephthalate, acrylic resins, such as polyacrylic acid and polymethacrylic acid, vinyl resins, such as polyvinyl chloride, polyamide resins, and combinations thereof.

Although in the first embodiment, the fixing portions 20 are provided to fix three layers, i.e., the surface layer 2, the surface layer 3, and the water-absorbent polymer layer 4, the fixing portions may also be used to fix two layers, i.e., the surface layer 2 and the water-absorbent polymer layer 4, or two layers, i.e., the surface layer 3 and the water-absorbent polymer layer 4. Further, it is sufficient if the water-absorbent polymer layer 4 is fixed to the surface layer 2 or the surface layer 3, or both, at least at one point.

The shape of the fixing portion 20 may be, but is not limited to, dot, linear, ellipse, helical, lattice, or the like. For example, FIG. 5(A) to (H) are schematic plan views of the body wiping sheets 1 according to the third to tenth embodiments, respectively.

In the body wiping sheet 1 according to the third embodiment shown in FIG. 5(A), three layers of the surface layers 2 and 3 and the water-absorbent polymer layer 4 are fixed by two substantially linear fixing portions 20 that are provided in parallel to each other and that extend from one end to the other end in the longitudinal direction of the body wiping sheet 1, as in the body wiping sheet 1 according to the first embodiment shown in FIG. 3. However, the fixing portions 20 here are provided away from the shaded portions, in which two surface layers 2 and 3 are joined, in the short direction vertical to the longitudinal direction of the body wiping sheet 1. That is, the fixing portions 20 here are provided inwardly from the shaded portions of the body wiping sheet 1.

The body wiping sheet 1 according to the fourth embodiment shown in FIG. 5(B) includes a first fixing portion 20 extending from one end to the other end in the longitudinal direction of the body wiping sheet 1, and a second fixing portion 20 extending from one end to the other end in the short direction of the body wiping sheet 1 vertical to the first fixing portion 20.

The body wiping sheet 1 according to the fifth embodiment shown in FIG. 5(C) includes two substantially linear fixing portions 20 diagonally crossing each other along the diagonal lines of the body wiping sheet 1.

The body wiping sheet 1 according to the sixth embodiment shown in FIG. 5(D) includes dot fixing portions 20 at the center of the body wiping sheet 1.

The body wiping sheet 1 according to the seventh embodiment shown in FIG. 5(E) includes one substantially linear fixing portion 20 extending in the longitudinal direction of the body wiping sheet 1 at the center of the width direction of the body wiping sheet 1.

The body wiping sheet 1 according to the eighth embodiment shown in FIG. 5(F) includes multiple (three in this figure) curved fixing portions 20 disposed at random throughout the body wiping sheet 1.

The body wiping sheet 1 according to the ninth embodiment shown in FIG. 5(G) includes multiple (five in this figure) dot fixing portions 20 disposed at random throughout the body wiping sheet 1.

The body wiping sheet 1 according to the tenth embodiment shown in FIG. 5(H) includes one substantially linear fixing portion 20 extending in the longitudinal direction of the body wiping sheet 1 at the center of the width direction of the body wiping sheet 1 but within the region of the water-absorbent polymer 4.

In any of the third to tenth embodiments above, the fixing portion 20 can eliminate or reduce the relative displacement between the layers by fixing the water-absorbent polymer layer 4 to the surface layer 2 or the surface layer 3, or both.

Figure 6:
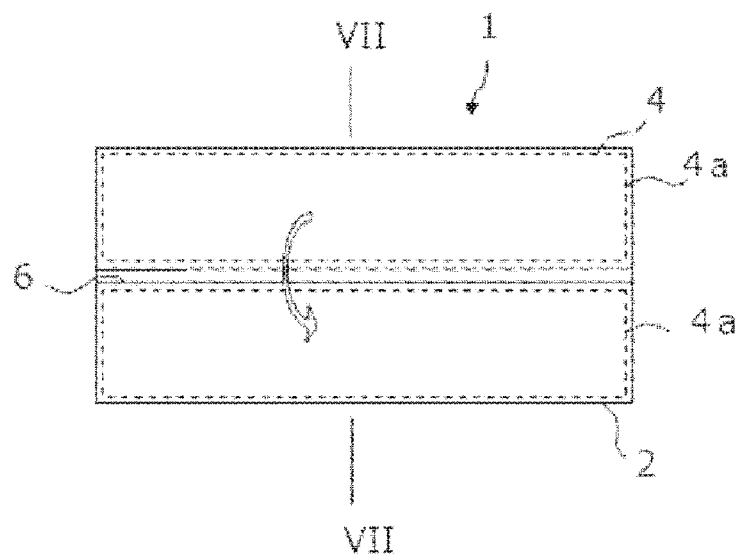
FIG. 6 is a schematic plan view of the body wiping sheet according to the eleventh embodiment of the present invention.
Figure 7:
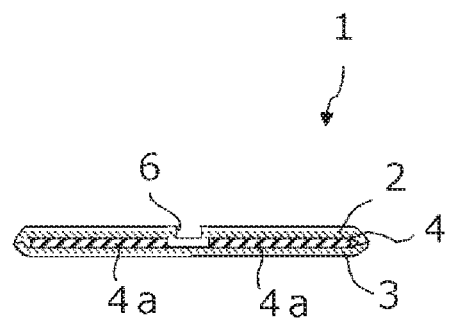
FIG. 7 is a sectional view along the VII-VII line in FIG. 6.

As shown in FIGS. 6 and 7, the body wiping sheet 1 according to the eleventh embodiment of the present invention includes a depressed portion 6 extending substantially linearly in the longitudinal direction at the center of the width direction of the body wiping sheet 1. The depressed portion 6 separates the water-absorbent polymer layer 4 into two portions 4a. With the depressed portion 6, the body wiping sheet 1 can be easily folded in half in the arrow direction; thus, the sheet is easily used for wiping.

In this embodiment, the bottom surface of the depressed portion 6 is formed and defined by the portion in which two layers, i.e., the surface layer 2 and the surface layer 3, are joined. The depressed portion 6 is defined by a thickness decreased from, the thickness of the three layers, i.e., the surface layer 2, the surface layer 3, and the water-absorbent polymer layer 4. However, the structure of each layer of the body wiping sheet 1 is not limited to the structure shown in these figures as long as the depressed portion 6 has a thickness relatively less than the thicknesses of both side portions in the width direction of the body wiping sheet 1.

Figure 8:
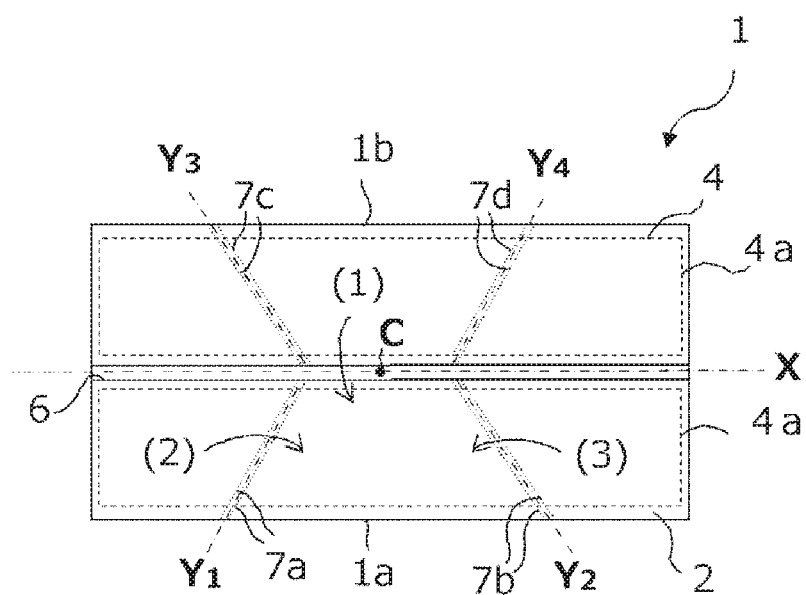
FIG. 8 is a plan view of the body wiping: sheet according to the twelfth embodiment of present invention.

As shown in FIG. 8, the body wiping sheet 1 according to the twelfth embodiment of present invention includes a pair of a guiding line 7a and a guiding line 7b, as well as a pair of a guiding line 7C and a guiding line 7d, in addition to the depressed portion 6 described in the eleventh embodiment. The guiding line 7a and the guiding line 7b each extend along the imaginary lines $Y_1$ and $Y_2$ that extend apart from each other in the longitudinal direction of the body wiping sheet 1 between the long side 1a of the body wiping sheet 1 and positions each located at the same distance from the center C in the longitudinal direction of the body wiping sheet 1 in the line X extending in the longitudinal direction of the body wiping sheet 1 at the center of the width direction of the body wiping sheet 1. The guiding line 7c and the guiding line 7d each extend along the imaginary lines $Y_3$ and $Y_4$ that extend apart from each other in the longitudinal direction of the body wiping sheet 1 between the long side 1b of the body wiping sheet 1 and positions each located at the same distance from the center C in the longitudinal direction of the body wiping sheet 1 in the line X extending in the longitudinal direction of the body wiping sheet 1 at the center of the width direction of the body wiping sheet 1. The guiding lines 7a, 7b, 7c, and 7d may be in the form of depressed portions obtained by embossing, in the form of multiple holes provided separately from each other, in the form of stitching with thread, or in the form of markers, tape, or the like. The guiding lines 7a, 7b, 7c, and 7d may be provided on one surface or both surfaces, preferably both surfaces, of the body wiping sheet 1. The expression "along the imaginary lines" includes cases in which they are provided on the imaginary lines and cases in which they are provided parallel to the imaginary lines.

Figure 9:
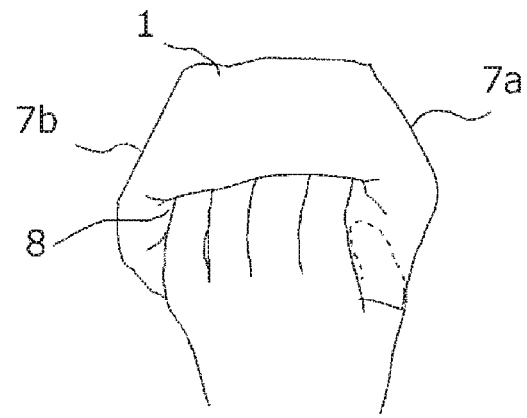
FIG. 9 schematically illustrates the body wiping sheet of FIG. 8 in use.

According to this structure, in FIG. 8, the body wiping sheet 1 is folded in half between the line X as the arrow (1) shows, one folded end is folded inwardly as the arrow (2) shows, the other folded end is folded inwardly as the arrow (3) shows, whereby the body wiping sheet 1 is folded into a mitten-like shape as shown in FIG. 9. By placing four fingers, except the thumb, into a space 8 of the mitten while pressing with the thumb the folded portion at the ends in the longitudinal direction of the mitten, the user, i.e., the wearer of the body wiping sheet 1, can perform wiping precisely in accordance with the operation of the hand.

Figure 10:
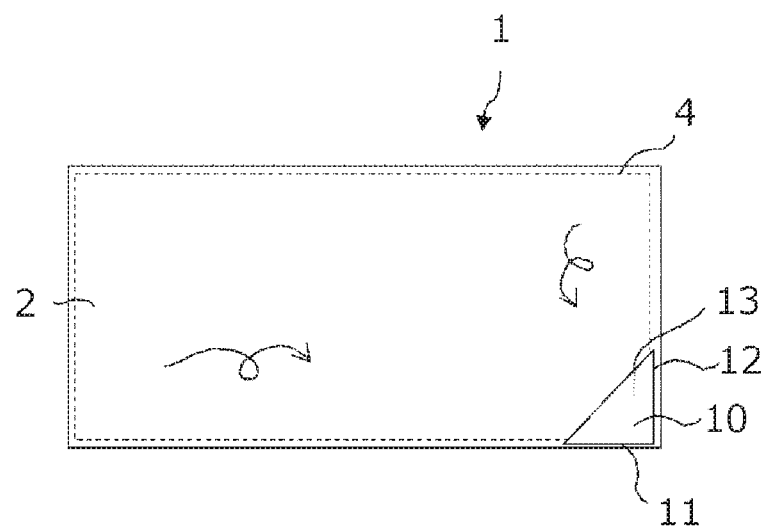
FIG. 10 is a plan view of the body wiping sheet according to the thirteenth embodiment of present invention.

As shown in FIG. 10, the body wiping sheet 1 according to the twelfth embodiment of the present invention includes a small piece 10 at a corner of the surface layer 2 or the surface layer 3. The material constituting the small piece 10 is not limited. For example, the material may be the same material as or a different material from that of the surface layer 3. The shape of the small piece 10 is, for example, but not limited to, a triangle, and two sides 11 and 12 of the small piece 10 are joined to the two sides that form a corner of the surface layer 3. The joining may be performed by welding with ultrasonic welding or heat sealing, adhesion with an adhesive, sewing with thread, bonding by embossing, fusing with a fusing machine, welding with a welding machine, or the like. The small piece 10 defines a pocket 13 for accommodating the body wiping sheet 1 between the piece and the surface layer 3.

Figure 11:
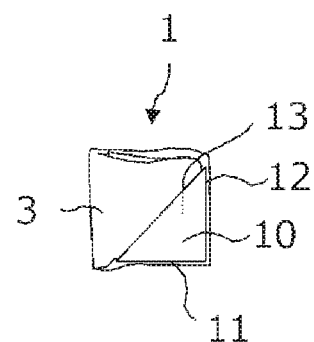
FIG. 11 is a plan view showing the state in which the body wiping sheet of FIG. 10 is folded.

Thus, when the body wiping sheet 1 is folded toward the pocket 13 as shown in the arrows in FIG. 10, the body wiping sheet 1 can be accommodated in the pocket 13 as shown in FIG. 11. In this manner, wiping can be performed while the sheet is folded into a small size. Furthermore, the body wiping sheet 1 after use can be folded into a small size for disposal.

The present invention is described below in more detail with reference to Examples. However, the present invention is not limited to these Examples.

EXAMPLES

Test Example 1

Production of Body Wiping Sheet

Example 1

(1) Production of Surface Layer

A spunlace non-woven fabric comprising 80% of rayon fiber and 20% of polyethylene terephthalate/polyethylene core-sheath bicomponent fiber as fiber components and having a basis weight of 40 g/m² was produced. This fabric was used as two surface layers. Each surface layer had a size of 300 mm (length)×200 to 400 mm (width).

(2) Production of Water-Absorbent Polymer Layer

A water-absorbent polymer-containing sheet was used as a water-absorbent polymer layer. This sheet was produced by an air-laid method. The water-absorbent polymer contained in the sheet was a crosslinked sodium polyacrylate salt. The basis weight of the sheet of Example 1 was adjusted to 230 g/m². As the fiber composition, this sheet contained a natural cellulose fiber comprising wood pulp.

(3) Production of Body Wiping Sheet

Between the two surface layers, the water-absorbent polymer layer and an additional heat-fusible layer comprising 100% of polypropylene/polyethylene core-sheath fiber, were disposed. These four layers were joined by heat sealing, thus producing a wiping sheet.

In Examples 2, the basis weight of the water-absorbent polymer in the water-absorbent polymer layer was adjusted to 138 g/m$^2$ to produce a body wiping sheet.

In Examples 3, the basis weight of the water-absorbent polymer in the water-absorbent polymer layer was adjusted to 50 g/m$^2$ to produce a body wiping sheet.

In Example 4, the water-absorbent polymer for the water-absorbent polymer layer was processed into a fibrous structure, and then, the basis weight of the water-absorbent polymer layer was adjusted to 68 g/m$^2$ to produce a body wiping sheet.

As Comparative Example 1, a cloth towel was used.

As Comparative Example 2, a single layer sheet composed of a commercially available non-woven fabric was used.

Test Example 2

Heat Retention Test

The body wiping sheets of Examples 1 to 4 and Comparative Examples 1 and 2 produced in Test Example 1 were each folded to about 10 cm×about 30 cm, moistened with water for a duration of time to sufficiently swell the water-absorbent polymer, and heated in a microwave. Subsequently, after the temperature at the center of the body wiping sheet surface in a folded state was decreased to 60° C., the temperature at the center of the body wiping sheet surface was measured every 2 minutes for 20 minutes using a radiation thermometer (TA410NH produced by Ichinen Tasco Co., Ltd.).

Figure 12:
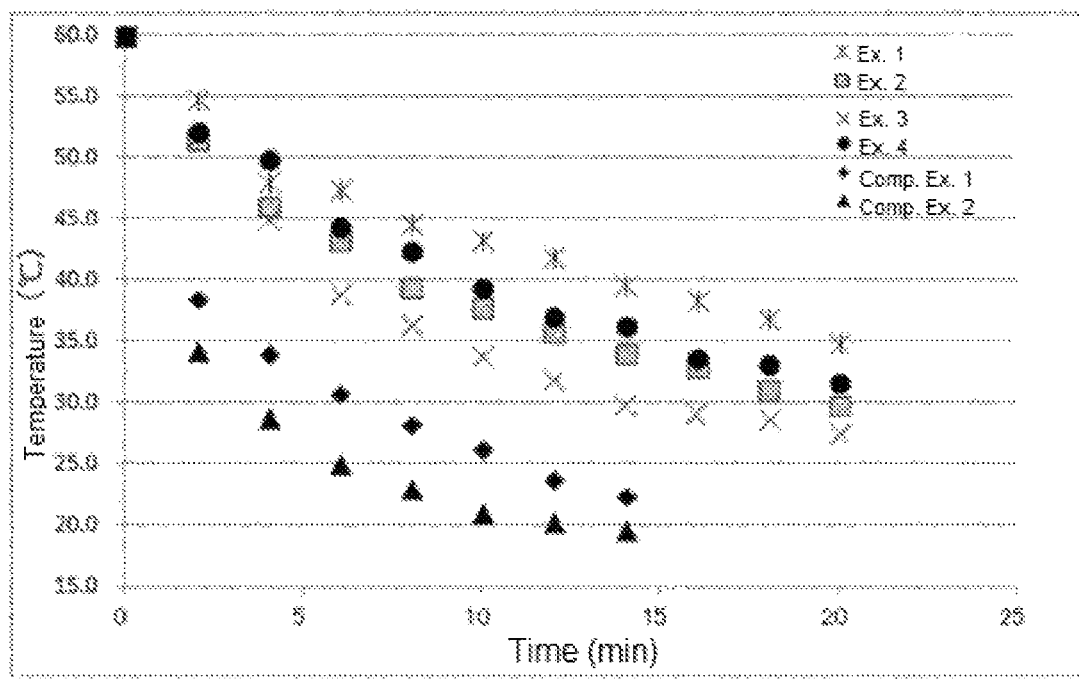
FIG. 12 is a graph showing the results of a heat retention test with respect to the body wiping sheets.

Table 1 and FIG. 12 show the results.

(2) Production of Water-Absorbent Polymer Layer

A non-woven fabric comprising pulp and a binder, containing 9 g/m$^2$ of water-absorbent polymer, and having a basis weight of 89 g/m$^2$ was produced by an air-laid method, thus obtaining a water-absorbent polymer layer.

(3) Production of Body Wiping Sheet

Figure 13:
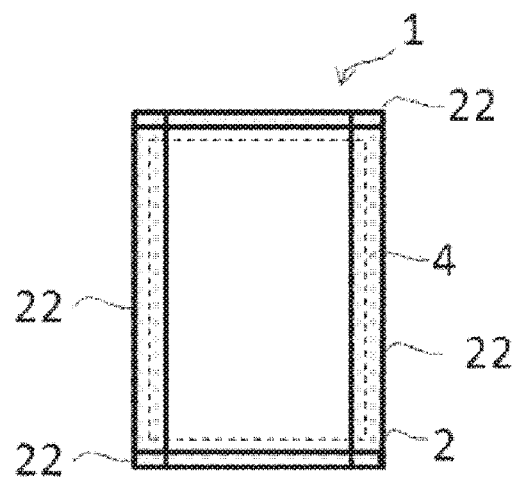
FIG. 13 is a schematic plan view of the body wiping sheet of Example 5.
Figure 14:
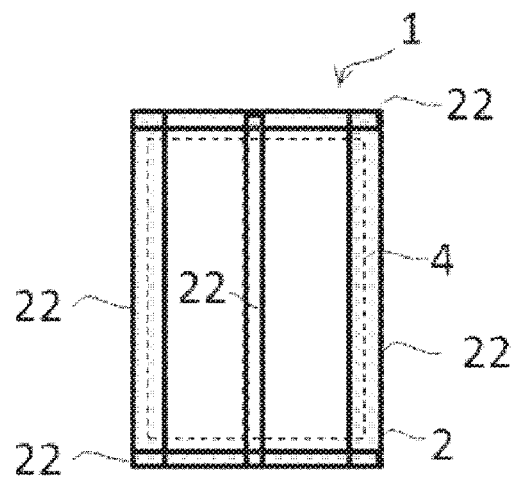
FIG. 14 is a schematic plan view of the body wiping sheet of Example 6.

The water-absorbent polymer layer having a width of 18.2 cm was placed on a 20-cm-wide roll of the non-woven fabric surface layer at intervals of about 3 cm in the length direction of the water-absorbent polymer layer while the water-absorbent polymer layer was cut to a length of 27 cm. A 20-cm-wide roll of the non-woven fabric surface layer was then placed over the water-absorbent polymer layers to sandwich the water-absorbent polymer layers to obtain three-layer sheets. Each of the three-layer sheets was moved using a moving device, and regions each having a width of 1.5 cm from each end in the width direction of the sheet were fused along the moving direction of the sheet by using heating rollers disposed above the sheet. The moving direction of the sheet was the same as the length direction of the sheet. Subsequently, the portions in which the water-absorbent polymer layer was not sandwiched in the width direction of the sheet were fused using a heating roller having a width of 2.5 cm, and each portion in which the two surface layers were joined between adjacent three-layer sheets was cut in the width direction at the middle, thus obtaining body wiping sheets of Example 5 (FIG. 13).

Figure 15:
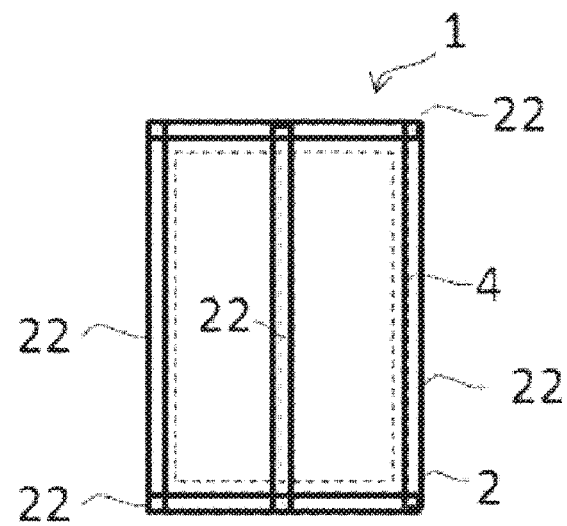
FIG. 15 is a schematic plan view of the body wiping sheet of Example 7.
Figure 16:
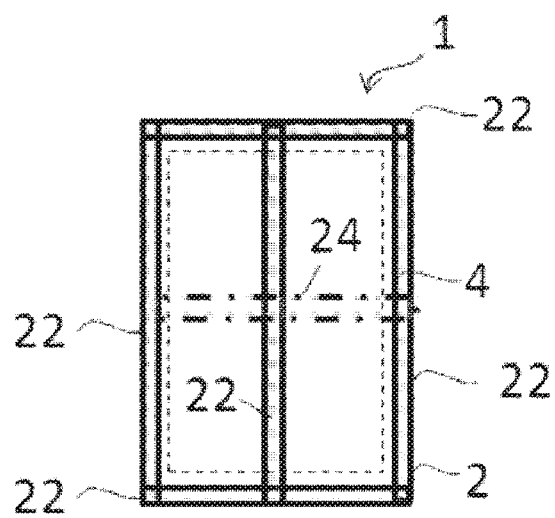
FIG. 16 is a schematic plan view of the body wiping sheet of Example 8.
Figure 17:
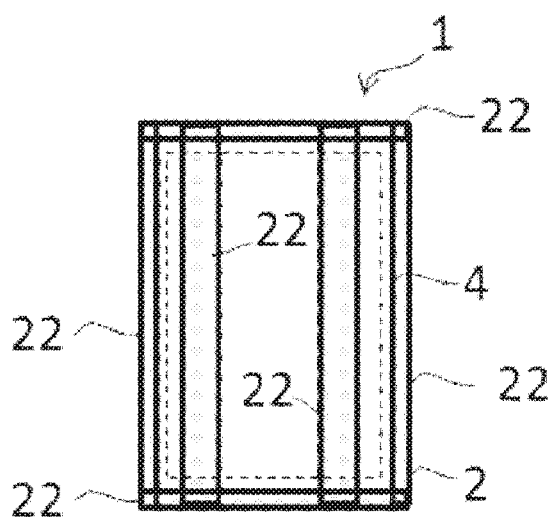
FIG. 17 is a schematic plan view of the body wiping sheet of Example 9.
Figure 18:
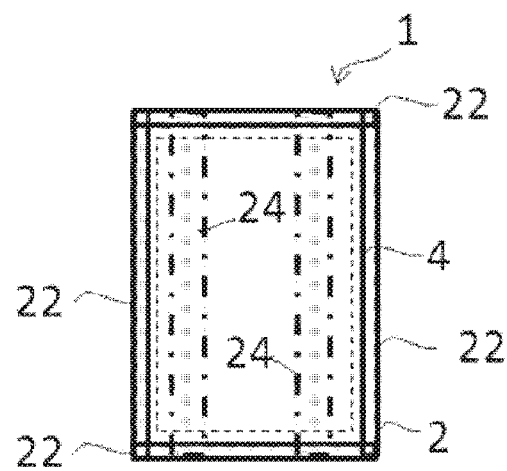
FIG. 18 is a schematic plan view of the body wiping sheet of Example 10.

Below, in FIGS. 13 to 22, the reference numeral 1 denotes a body wiping sheet, the reference numeral 2 denotes a surface layer, the reference numeral 4 denotes a water-absorbent polymer layer, and the reference numeral 22 denotes a fused portion. In FIGS. 16 and 18, the reference numeral 24 denotes a fused portion obtained using a heating roller disposed below the body wiping sheet 1.

Example 6

The body wiping sheet of Example 6 (FIG. 14) was obtained as in Example 5, except that a heating roller having

TABLE 1

| | Sample name | | | | | |
|---|---|---|---|---|---|---|
| Time (min) | Example 1 | Example 2 | Example 3 | Example 4 | Comp. Ex. 1 | Comp. Ex. 2 |
| | | | Temperature (° C.) | | | |
| 0 | 60.0 | 60.0 | 60.0 | 60.0 | 60.0 | 60.0 |
| 2 | 54.8 | 51.6 | 51.8 | 52.2 | 38.6 | 34.4 |
| 4 | 48.1 | 46.1 | 45.1 | 50.0 | 34.1 | 28.9 |
| 6 | 47.5 | 43.3 | 38.9 | 44.5 | 30.8 | 25.1 |
| 8 | 44.7 | 39.4 | 36.5 | 42.5 | 28.3 | 23.1 |
| 10 | 43.3 | 37.8 | 34.0 | 39.4 | 26.3 | 21.1 |
| 12 | 42.0 | 35.9 | 32.0 | 37.1 | 23.9 | 20.3 |
| 14 | 39.8 | 34.1 | 30.0 | 36.4 | 22.5 | 19.7 |
| 16 | 38.5 | 33.0 | 29.1 | 33.7 | | |
| 18 | 37.0 | 31.1 | 28.7 | 33.2 | | |
| 20 | 34.9 | 29.9 | 27.6 | 31.8 | | |
| Water content (g) | 110 to 130 | 120 to 150 | 60 to 80 | 90 to 110 | 120 | 40 |

Test Example 3

Production of Body Wiping Sheet

Example 5

(1) Production of Surface Layer

AL045 TCDP-H (produced by Kinsei Seishi Co., Ltd.) (an air-laid non-woven fabric comprising pulp and a polyethylene terephthalate/polyethylene core-sheath bicomponent fiber as fiber components and having a basis weight of 45 g/m$^2$) was used as two surface layers.

a width of 1 cm was additionally disposed above the sheet at the center of the width direction of the sheet so that the sheet was further fused along the longitudinal direction of the sheet at the center of the width direction of the body wiping sheet.

Example 7

Instead of fusing the regions having a width of 1.5 cm from each end in the width direction of the sheet along the moving direction of the sheet by using heating rollers as in Example 5, regions having a width of 8 mm from each end in the width direction of the sheet were fused along the moving direction of the sheet by using heating rollers. Further, a heating roller having a width of 1 cm was disposed above the sheet at the center of the width direction of the sheet to fuse the sheet along the moving direction of the sheet at the center of the width direction of the sheet. In this manner, a body wiping sheet of Example 7 was obtained (FIG. 15).

Example 8

The body wiping sheet of Example 8 (FIG. 16) was obtained as in Example 7, except that a heating roller having a width of 2 cm was additionally disposed below the sheet at the center of the width direction of the sheet so that the sheet was further fused from one end to the other end in the width direction along the width direction of the sheet at the center of the longitudinal direction of the body wiping sheet.

Example 9

Instead of fusing the regions having a width of 1.5 cm from each end in the width direction of the sheet along the moving direction of the sheet by using heating rollers as in Example 5, regions having a width of 8 mm from each end in the width direction of the sheet were fused along the moving direction of the sheet by using heating rollers. Further, heating rollers with a width of 2 cm were disposed above the portions each located 5 cm away from each end in the width direction of the sheet to fuse the sheet along the moving direction of the sheet to form two additional joined portions extending in the longitudinal direction away from the joined portions at the ends, in addition to the joined portions at the ends in the longitudinal direction of the body wiping sheet. In this manner, a body wiping sheet of Example 9 was obtained (FIG. 17).

Example 10

The body wiping sheet of Example 10 (FIG. 18) was obtained as in Example 9, except that heating rollers disposed below the sheet were used to form the joined portions having a width of 2 cm along the moving direction of the sheet at positions 5 cm away from the ends in the width direction of the sheet.

Example 11

Figure 19:
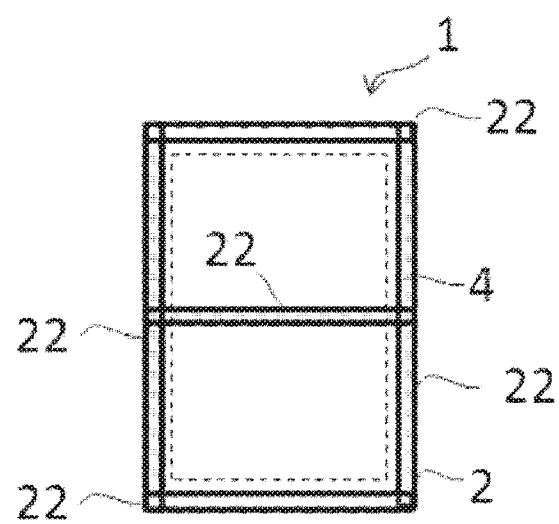
FIG. 19 is a schematic plan view of the body wiping sheet of Example 11.

Instead of fusing the regions having a width of 1.5 cm from each end in the width direction of the sheet along the moving direction of the sheet by using heating rollers as in Example 5, regions having a width of 8 mm from each end in the width direction of the sheet were fused along the moving direction of the sheet by using heating rollers. Further, a heating roller having a width of 1 cm was disposed above the sheet at the center of the longitudinal direction of the sheet to fuse the sheet along the width direction of the sheet at the center of the longitudinal direction of the sheet. In this manner, a body wiping sheet of Example 11 was obtained (FIG. 19).

Example 12

Figure 20:
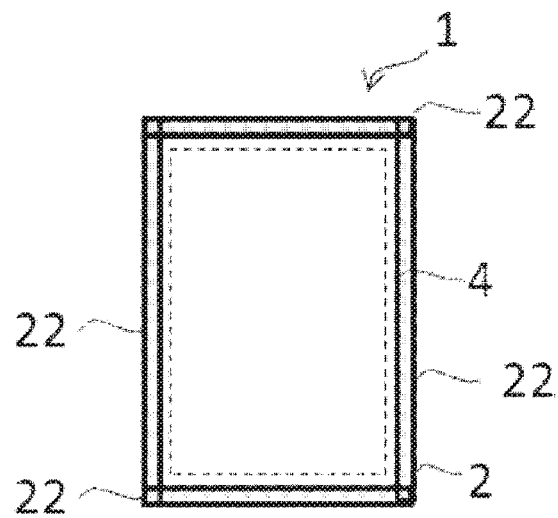
FIG. 20 is a schematic plan view of the body wiping sheet of Example 12.
Figure 21:
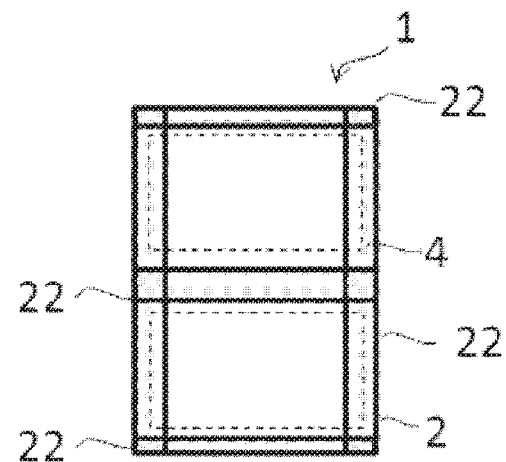
FIG. 21 is a schematic plan view of the body wiping sheet of Example 13.

Instead of fusing the regions having a width of 1.5 cm from each end in the width direction of the sheet along the moving direction of the sheet by using heating rollers as in Example 5, regions having a width of 8 mm from each end in the width direction of the sheet were fused along the moving direction of the sheet by using heating rollers. A body wiping sheet of Example 12 was thus obtained (FIG. 20).

Test Example 4

Evaluation of Displacement

After each of the body wiping sheets of Examples 5 to 12 was soaked in hot water at 60° C. for 2 minutes, one side of the sheet was lifted while it was spread, and displacement of the contents was evaluated. The results revealed that the body wiping sheets of Examples 5 to 11 showed no or reduced displacement, compared with that of Example 12. The body wiping sheet of Example 12 showed displacement.

Example 13

The body wiping sheet of Example 13 (FIG. 21) was obtained as in Examples 5, except that the water-absorbent polymer layer was cut to a length of 12 cm, and the cutting of the fused portion in the width direction of the sheet was performed once every two times.

Example 14

Figure 22:
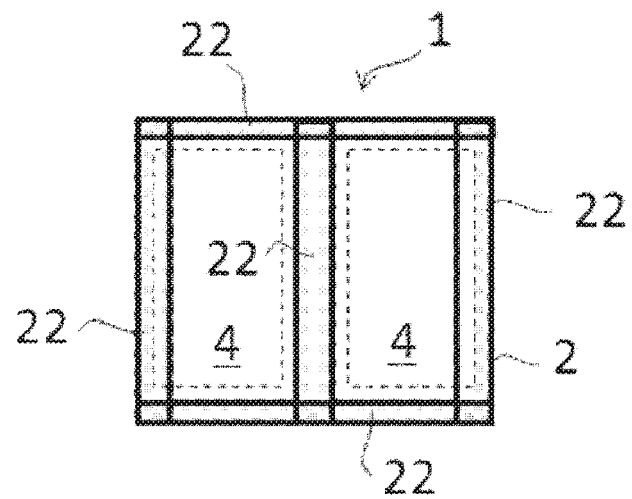
FIG. 22 is a schematic plan view of the body wiping sheet of Example 14.

Two water-absorbent polymer layers having a width of 13.8 cm disposed 1 cm apart from each other in the width direction were placed on a 30-cm-wide roll of a non-woven fabric surface layer at intervals of about 3 cm in the length direction of the water-absorbent polymer layers while the water-absorbent polymer layers were cut to a length of 17 cm. A 30-cm-wide roll of the non-woven fabric surface layer was then placed over the water-absorbent polymer layers to sandwich the water-absorbent polymer layers to obtain three-layer sheets. Each of the three-layer sheets was moved using a moving device, and regions each having a width of 1.5 cm from each end in the width direction of the sheet were fused along the moving direction of the sheet by using heating rollers disposed above the sheet. Subsequently, the region having a width of 1 cm at the center of the width direction of the sheet was fused using a heating roller disposed above the sheet. The moving direction of the sheet was orthogonal to the length direction of the sheet. Thereafter, the portions in which the water-absorbent polymer layers were not sandwiched in the width direction of the sheet were fused using a heating roller having a width of 2.5 cm, and each portion in which the two surface layers were joined between adjacent three-layer sheets was cut in the width direction at the middle, thus obtaining body wiping sheets of Example 14 (FIG. 22).

Example 15

The body wiping sheet of Example 15 was obtained as in Example 5, except that the surface layers were changed to AL060UTHP-H-S (produced by Kinsei Seishi. Co., Ltd.) (an air-laid non-woven fabric comprising pulp and a polyethylene terephthalate/polyethylene core-sheath bicomponent fiber as fiber components and having a basis weight of 60 g/m$^2$).

Example 16

The body wiping sheet of Example 16 was obtained as in Example 5, except that the surface layers were changed to AL070UTHP-H-S (produced by Kinsei Seishi. Co., Ltd.)

(an air-laid non-woven fabric comprising pulp and a polyethylene terephthalate/polyethylene core-sheath bicomponent fiber as fiber components and having a basis weight of 70 g/m$^2$).

Example 17

The body wiping sheet of Example 17 was obtained as in Example 5, except that the surface layers were changed to 9570-O (produced by Shinwa Co., Ltd.) (a non-woven fabric comprising polyethylene and polypropylene as fiber components and having a basis weight of 70 g/m$^2$).

Example 18

The body wiping sheet of Example 18 was obtained as in Example 5, except that the surface layers were changed to 7840Z+6515-1A (produced by Shinwa Co., Ltd.) (a non-woven fabric obtained by interweaving a non-woven fabric comprising polyethylene terephthalate as a fiber component and having a basis weight of 40 g/m$^2$ and a non-woven fabric comprising a polypropylene/polyethylene core-sheath bicomponent fiber as a fiber component and having a basis weight of 15 g/m$^2$).

Example 19

The body wiping sheet of Example 19 was obtained as in Example 5, except that the surface layers were changed to 2ATEP2060 (produced by Nisshinbo Textile Inc.) (a spunlace non-woven fabric comprising cotton and polyethylene terephthalate as fiber components and having a basis weight of 60 g/m$^2$).

Example 20

The body wiping sheet of Example 20 was obtained as in Example 5, except that the surface layers were changed to 3RTEP0080 (produced by Nisshinbo Textile Inc.) (a spunlace non-woven fabric comprising rayon and polyethylene terephthalate as fiber components and having a basis weight of 80 g/m$^2$).

Example 21

The body wiping sheet of Example 21 was obtained as in Example 5, except that the surface layers were changed to two different layers of AL045 TCDP-H and 6525-1A (Shinwa Co., Ltd.) (a non-woven fabric comprising a polypropylene/polyethylene core-sheath bicomponent fiber as a fiber component and having a basis weight of 25 g/m$^2$), and that the 6525-1A was disposed at the water-absorbent polymer layer side.

Example 22

The body wiping sheet of Example 22 was obtained as in Example 5, except that the surface layers were changed to two different layers, 2ATEP2060 and 6525-1A (Shinwa Co., Ltd.) (a non-woven fabric comprising a polypropylene/polyethylene core-sheath bicomponent fiber as a fiber component and having a basis weight of 25 g/m$^2$), and that the 6525-1A was disposed at the water-absorbent polymer layer side.

Example 23

The body wiping sheet of Example 23 was obtained as in Example 5, except that the surface layers were changed to two different layers, 2ATEP2040 (produced by Nisshinbo Textile Inc.) (a spunlace non-woven fabric comprising cotton and polyethylene terephthalate as fiber components and having a basis weight of 40 g/m$^2$) and 6525-1A, and that the 6525-1A was disposed at the water-absorbent polymer layer side.

Example 24

The body wiping sheet of Example 24 was obtained as in Example 5, except that one of the surface layers was changed to a two-layer sheet of 6525-1A and 2ATEP2040, that the 6525-1A was disposed at the water-absorbent polymer layer side, and that the other of the surface layers was changed to 2ATEP2060.

Example 25

A spunlace non-woven fabric comprising 16% of cotton, 47% of polyethylene terephthalate, and 37% of polypropylene/polyethylene core-sheath fiber as fiber components, and having a basis weight of 60 g/m$^2$ was used as surface layers. A water-absorbent polymer layer having a width of 17.7 cm was placed on a 22.5-cm-wide roll of the non-woven fabric surface layer at intervals of about 3 cm in the length direction of the water-absorbent polymer layer while the water-absorbent polymer layer was cut to a length of 27 cm. The water-absorbent polymer layer was then sandwiched between two 22.5-cm-wide rolls of the non-woven fabric surface layer disposed above and below the non-woven fabric surface layer to obtain three-layer sheets. Each of three-layer sheets was moved using a moving device, and regions each having a width of 1.5 cm from each end in the width direction of the sheet were fused along the moving direction of the sheet by using heating rollers disposed above the sheet. The moving direction of the sheet was the same as the length direction of the sheet. Subsequently, the portions in which the water-absorbent polymer layer was not sandwiched in the width direction of the sheet were fused using a heating roller having a width of 2.5 cm, and each portion in which the two surface layers were joined between adjacent three-layer sheets was cut in the width direction at the middle, thus obtaining body wiping sheets of Example 25. The fused portions in this embodiment were located as in Example 12 shown in FIG. 20.

Example 26

The body wiping sheet of Example 26 was obtained as in Example 25, except that the surface layers were changed to a spunlace non-woven fabric comprising 17% of cotton, 41% of polyethylene terephthalate, and 42% of polypropylene/polyethylene core-sheath fiber as fiber components, and having a basis weight of 60 g/m$^2$.

Example 27

The body wiping sheet of Example 27 (FIG. 23) was obtained as in Example 26, except that regions having a width of 5 mm and located 5 cm inward from each end in the width direction of the sheet were further fused along the moving direction of the sheet by using ultrasonic sewing machine rotary units (produced by Seicensha Electronics Co., Ltd.) disposed above and below the sheet.

Figure 23:
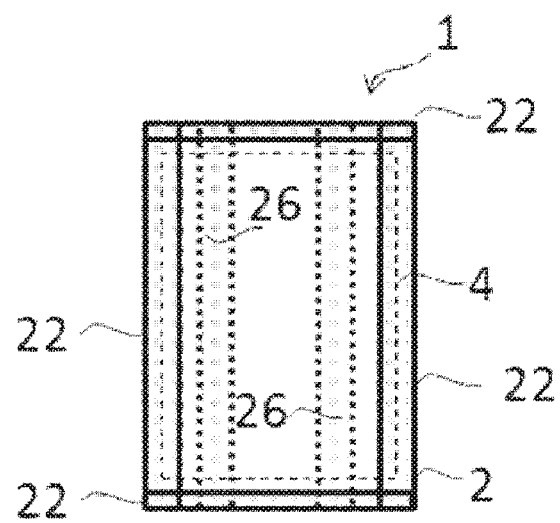
FIG. 23 is a schematic plan view of the body wiping sheet of Example 27.

In FIG. 23, the reference numeral 1 denotes a body wiping sheet, the reference numeral 2 denotes a surface layer, the reference numeral 4 denotes a water-absorbent polymer layer, the reference numeral 22 denotes a portion fused using a heating roller, and the reference numeral 26 denotes a portion fused using an ultrasonic sewing machine rotary unit.

Example 28

The body wiping sheet of Example 28 was obtained as in Example 27, except that the width of the ultrasonically fused regions was changed to 48 mm.

The embodiments and Examples according to the present invention are specifically described above. However, the present invention is not limited to these embodiments, and any modifications based on the technical idea of the present invention are possible.

The configurations, methods, processes, shapes, materials, numerical values, and the like described in the above embodiments and Examples are merely examples, and configurations, methods, processes, shapes, materials, numerical values and the like different from these may be used as necessary. The following are examples.

In the first to fourth embodiments, it is also sufficient if the water-absorbent polymer layer 4 is not enclosed in two surface layers 2 and 3, and if the peripheral ends of the water-absorbent polymer layer 4 are united with the surface layer 2 and the surface layer 3 to an extent that the water-absorbent polymer in the water-absorbent polymer layer 4 is sufficiently prevented from leaking outside the body wiping sheet 1. The unification of the three layers, i.e., the surface layers 2 and 3 and the water-absorbent polymer layer 4, may be performed by welding with ultrasonic welding or heat sealing, adhesion with an adhesive, sewing with thread, bonding by embossing, fusing with a fusing machine, welding with a welding machine, or the like.

In the twelfth embodiment, only the guiding lines 7c and 7d may be provided, and the guiding lines 7a and 7b may be omitted.

Further, the configurations, methods, processes, shapes, materials, numerical values, and the like of the embodiments described above can be combined with each other in any suitable manner without departing from the spirit of the present invention. The present invention also includes the following configurations.

Item 1. A body wiping sheet comprising:
two surface layers each comprising a non-woven fabric; and
a water-absorbent polymer layer that contains a water-absorbent polymer and that is disposed between the two surface layers in a stacked manner.

Item 2. The body wiping sheet according to item 1, wherein the body wiping sheet is a dry sheet and is moistened with water in use.

Item 3. The body wiping sheet according to Item 1 or 2, wherein the water-absorbent polymer layer is a sheet containing a water-absorbent polymer incorporated into a fibrous material, a sheet containing a water-absorbent polymer dispersed and solidified on a fibrous material, or a sheet containing a water-absorbent polymer processed into a fibrous structure.

Item 4. The body wiping sheet according to any one of Items 1 to 3, wherein the water-absorbent polymer layer contains the water-absorbent polymer in an amount capable of maintaining the temperature of the body wiping sheet at 30° C. or higher after the body wiping sheet is immersed in water for a duration of time to sufficiently swell the polymer, heated to 60° C., and then stored for 10 minutes in an environment at 20 to 25° C. at a humidity of 40 to 80%.

Item 5. The body wiping sheet according to any one of Items 1 to 4, wherein the body wiping sheet does not contain an aqueous cleaning agent.

Item 6. The body wiping sheet according to any one of Items 1 to 5, wherein the surface layers and the water-absorbent polymer layer are fixed at least at one point.

Item 7. The body wiping sheet according to Item 6, wherein the at least one fixing portion is substantially linear.

Item 8. The body wiping sheet according to Item 7, wherein the at least one substantially linear fixing portion extends from one end to the other end of the body wiping sheet.

Item 9. The body wiping sheet according to Item 6 or 7, wherein the body wiping sheet is substantially rectangular, and wherein the at least one fixing portion comprises two substantially linear fixing portions at least in one direction.

Item 10. The body wiping sheet according to any one of Items 6 to 9, wherein the at least one fixing portion comprises two substantially linear fixing portions that are provided at both ends of the body wiping sheet and that are formed simultaneously when the two surface layers are joined to each other.

Item 11. The body wiping sheet according to any one of Items 6 to 10, wherein the at least one fixing portion is a joined portion obtained by heat sealing.

Item 12. The body wiping sheet according to any one of Items 1 to 11, wherein the water-absorbent polymer layer is separated into two portions by a depressed portion that extends substantially linearly in the longitudinal direction at the center of the width direction of the body wiping sheet.

Item. 13. The body wiping sheet according to any one of Items 1 to 12, wherein the body wiping sheet is substantially rectangular and further has two guiding lines extending along imaginary lines that extend apart from each other in the longitudinal direction of the body wiping sheet between a long side of the body wiping sheet and positions each located at the same distance from the center of the longitudinal direction of the body wiping sheet in the line extending in the longitudinal direction of the body wiping sheet at the center of the width direction of the body wiping sheet.

Item 14. The body wiping sheet according to any one of Items 1 to 13, wherein the body wiping sheet further comprises a small piece that is attached to a corner of one of the two surface layers and that defines a pocket for accommodating the body wiping sheet between the piece and one of the surface layers.

INDUSTRIAL APPLICABILITY

The body wiping sheet of the present invention may be used by people to clean someone in need of cleaning or to clean one's own body where needed at various locations, including home, medical facilities such as hospitals, welfare facilities for the elderly, nursing homes, comprehensive commercial facilities, sport facilities, and the like.

The invention claimed is:
1. A body wiping sheet comprising:
two surface layers each comprising a non-woven fabric; and
a water-absorbent polymer layer that contains a water-absorbent polymer and that is disposed between the two surface layers in a stacked manner;
wherein the body wiping sheet is a dr sheet that does not contain an aqueous cleaning agent.
2. The body wiping sheet according to claim 1, wherein the water-absorbent polymer layer is a sheet containing a water-absorbent polymer incorporated into a fibrous mate- rial, a sheet containing a water-absorbent polymer dispersed and solidified on a fibrous material, or a sheet containing a water-absorbent polymer processed into a fibrous structure.

3. The body wiping sheet according to claim 1, wherein the water-absorbent polymer layer contains the water-absorbent polymer in an amount capable of maintaining the temperature of the body wiping sheet at 30° C. or higher after the body wiping sheet is immersed in water for a duration of time to sufficiently swell the polymer, heated to 60° C., and then stored for 10 minutes in an environment at 20 to 25° C. at a humidity of 40 to 80%.

4. The body wiping sheet according to claim 1, wherein the surface layers and the water-absorbent polymer layer are fixed at least at one point.

5. The body wiping sheet according to claim 4, wherein the at least one fixing portion is substantially linear.

6. The body wiping sheet according to claim 5, wherein the at least one substantially linear fixing portion extends from one end to the other end of the body wiping sheet.

7. The body wiping sheet according to claim 4, wherein the body wiping sheet is substantially rectangular, and wherein the at least one fixing portion comprises two substantially linear fixing portions at least in one direction.

8. The body wiping sheet according to claim 4, wherein the at least one fixing portion comprises two substantially linear fixing portions that are provided at both ends of the body wiping sheet and that are formed simultaneously when the two surface layers are joined to each other.

9. The body wiping sheet according to claim 4, wherein the at least one fixing portion is a joined portion obtained by heat sealing.

10. The body wiping sheet according to claim 1, wherein the water-absorbent polymer layer is separated into two portions by a depressed portion that extends substantially linearly in the longitudinal direction at the center of the width direction of the body wiping sheet.

11. The body wiping sheet according to claim 1, wherein the body wiping sheet is substantially rectangular and further has two guiding lines extending along imaginary lines that extend apart from each other in the longitudinal direction of the body wiping sheet between a long side of the body wiping sheet and positions each located at the same distance from the center of the longitudinal direction of the body wiping sheet in the line extending in the longitudinal direction of the body wiping sheet at the center of the width direction of the body wiping sheet.

12. The body wiping sheet according to claim 1, wherein the body wiping sheet further comprises a small piece that is attached to a corner of one of the two surface layers and that defines a pocket for accommodating the body wiping sheet between the piece and one of the surface layers.

13. A body wiping sheet comprising:
two surface layers each comprising a non-woven fabric; and
a water-absorbent polymer layer that contains a water-absorbent polymer and that is disposed between the two surface layers in a stacked manner;
wherein the body wiping contains water and does not contain an aqueous cleaning age.

14. The body wiping sheet according to claim 13, wherein the water-absorbent polymer layer is a sheet containing a water-absorbent polymer incorporated into a fibrous material, a sheet containing a water-absorbent polymer dispersed and solidified on a fibrous material, or a sheet containing a water-absorbent polymer processed into a fibrous structure.

15. The body wiping sheet according to claim 13, wherein the water-absorbent polymer layer contains the water-absorbent polymer in an amount capable of maintaining the temperature of the body wiping sheet at 30° C. or higher after the body wiping sheet is immersed in water for a duration of time to sufficiently swell the polymer, heated to 60° C., and then stored for 10 minutes in an environment at 20 to 25° C. at a humidity of 40 to 80%.

16. The body wiping sheet according to claim 13, wherein the surface layers and the water-absorbent polymer layer are fixed at least at one point.

17. The body wiping sheet according to claim 13, wherein the t least one fixing portion is substantially.

18. The body wiping sheet according to claim 13, wherein the water-absorbent polymer layer is separated into two portions by a depressed portion that extends substantially linearly in the longitudinal direction at the center of the width direction of the body wiping sheet.

19. The body wiping sheet according to claim 13, wherein the body wiping sheet further comprises a small piece that is attached to a corner of one of the two surface layers and that defines a pocket for accommodating the body wiping sheet between the piece and one of the surface layers.

* * * * *

UNITED STATES PATENT AND TRADEMARK OFFICE
CERTIFICATE OF CORRECTION

| | |
|---|---|
| PATENT NO. | : 11,027,516 B2 |
| APPLICATION NO. | : 16/099543 |
| DATED | : June 8, 2021 |
| INVENTOR(S) | : Mizue Takagi et al. |

It is certified that error appears in the above-identified patent and that said Letters Patent is hereby corrected as shown below:

In the Claims

Column 18, Line 63:
"a dr sheet"
Should read:
--a dry sheet--

Column 20, Line 33:
"the t least one fixing portion is substantially."
Should read:
--the at least one fixing portion is substantially linear.--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*